March 28, 1950     D. E. JACK     2,501,943
PIPE JOINT
Filed July 18, 1947
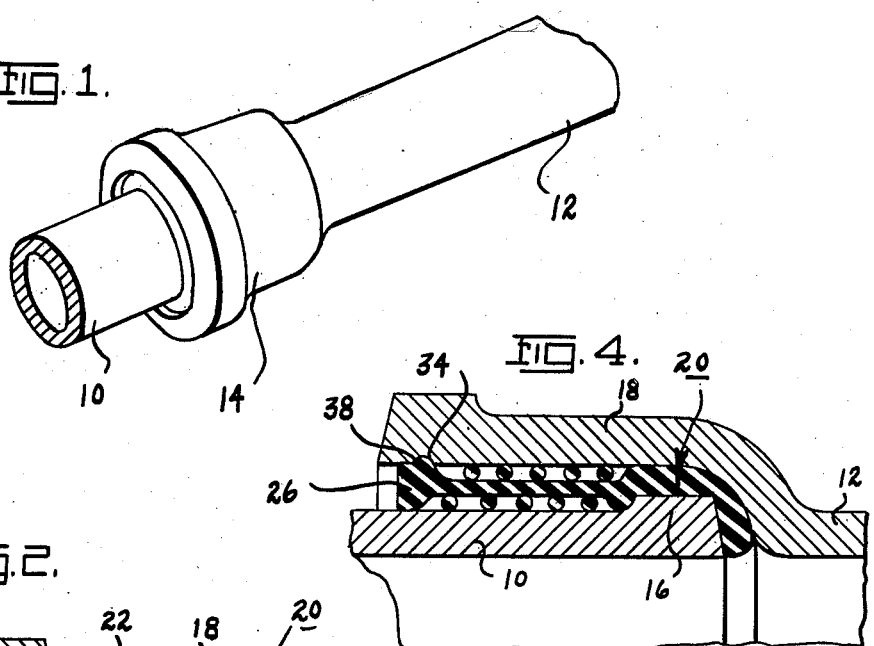
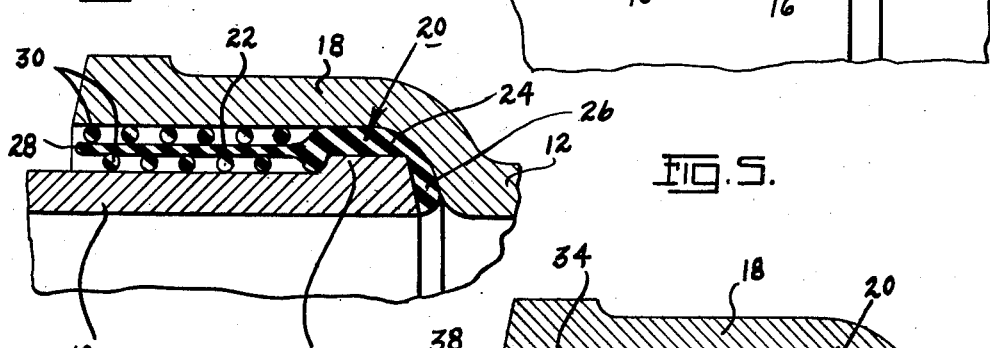
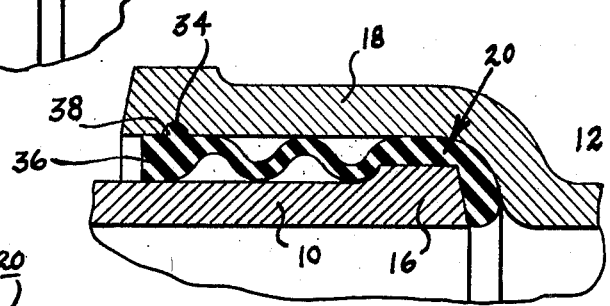
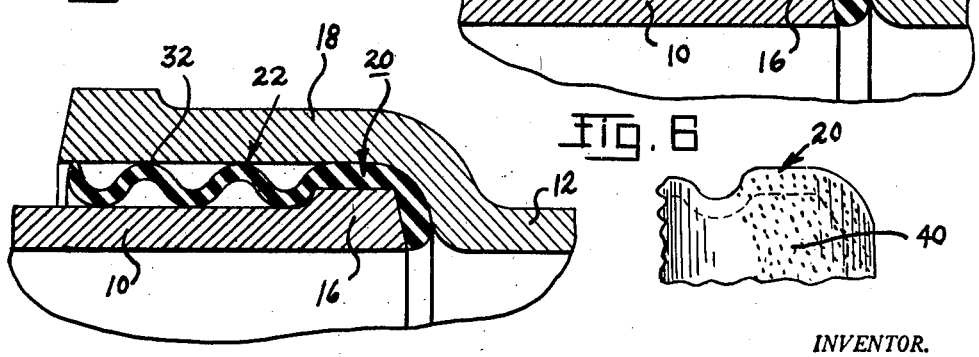
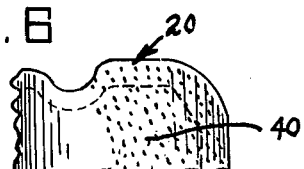
*INVENTOR.*
DELBERT E. JACK,
BY
Toulmin & Toulmin
*Attorneys*

Patented Mar. 28, 1950

2,501,943

UNITED STATES PATENT OFFICE 2,501,943

PIPE JOINT

Delbert E. Jack, New York, N. Y., assignor to The Duriron Company, Inc., New York, N. Y., a corporation of New York Application July 18, 1947, Serial No. 761,944

3 Claims. (Cl. 285—163)

This invention relates to gaskets for use in connection with pipe joints, particularly bell and spigot pipe joints, and to a method of making up bell and spigot pipe joints.

In many instances wherein bell and spigot pipe joints are to be employed, a number of factors must be considered in arriving at a satisfactory joint between the pipe ends. Some of these factors are the changes in temperature to which the pipes will be subjected which will lead to the expanding and contracting thereof; the pressure which it is desired to seal within the pipes; the type of fluid to be sealed; and the nature of the installation as to whether or not the pipe joints can be rigid or flexible.

It is customary in connection with bell and spigot pipe installations either to employ a resilient gasket member between the pipes, or to cement the pipes together with a substance which sets up into a hard sealing material.

In the event the fluid to be conveyed through the pipe is of a corrosive nature, such as an acid or an alkali, ordinary materials cannot be employed in the pipe. In such instances it is preferred to use a cast iron pipe which is high in silicon content. A cast iron of this nature is highly resistant to the corrosive action of both acids and alkalis but at the same time is very brittle, difficult to work, and subject to breakage upon being bent.

Pipes formed of this material are thus best utilized by not machine working them after they are taken from the mold and by installing them in such a manner that the pipe lengths are somewhat flexibly joined and in such a manner that the expansion or contraction of the pipe lengths due to temperature changes and the like will not produce buckling or high tensile stresses in the material which would be apt to break the pipes.

In the casting of pipes of a high silicon bearing cast iron it is necessary to avoid thin sections at the extremities of the castings. This leads to the casting of a flange around the outside of the spigot and of a pipe which operates to prevent the pipe end from splitting when the cast iron solidifies in the mold and is removed therefrom.

Due to the aforementioned limitations which are imposed upon the use of pipes made from this cast iron, it has been customary to grind off the aforementioned flange in order to provide a means for mounting a resilient sealing member on the spigot end of the pipe which would make a seal with the bell end of the adjacent pipe but still permit a certain amount of flexibility between the pipes.

As mentioned before, the machining of this type of cast iron is undesirable but, in addition to that disadvantage, this is an expensive work operation in connection with any kind of pipe.

Having in mind the foregoing, it is a primary object of the present invention to provide an improved sealing member for making up a joint between adjacent sections of bell and spigot pipe.

Another object is to provide an improved method of making pipe joints, especially in connection with bell and spigot pipes.

A still further object is the provision of a resilient gasket member to be employed in connection with bell and spigot pipe joints which acts adequately to seal the pipes but which permits a certain amount of relative movement therebetween.

These and other objects of this invention will become more apparent from the accompanying drawings in which:

Figure 1 is a perspective view of a typical bell and spigot pipe joint;

Figures 2 and 3 are vertical sections through a joint similar to that shown in Figure 1 and illustrating two forms of an improved gasket according to this invention;

Figures 4 and 5 illustrate modifications in the constructions shown in Figures 2 and 3 respectively; and Figure 6 is a fragmentary view showing how the lubricant-adhesive is applied to the gasket member during the assembly of the pipe joint.

Referring to the drawings, in Figure 1 10 indicates a length of pipe having a spigot end while 12 indicates a length of pipe having a bell end and the said spigot and bell ends are telescoped as at 14 to form a pipe joint.

Referring to Figure 2 it will be seen that the pipe 10 has an outwardly extending peripheral flange at 16, the purpose of this flange being to give the pipe 10 an anchor when a hard setting sealing compound is employed, and also to be provided in connection with the casting of pipes of certain materials such as high silicon bearing iron to prevent the pipe from splitting during the casting operation.

The end of the pipe 12 is flared out as at 18 to form a bell shaped recess of a size loosely to receive the spigot end of the pipe 10.

Between the bell end 18 of the pipe 12 and the spigot end of the pipe 10 there is a resilient gasket 20. This gasket comprises a sleeve portion 22 which rests between the annular surfaces of the bell and spigot ends of the pipe and an end part 24 which is channeled to receive the flange 16 and which fits tightly within the bell 18. The combination of the sleeve 22 and the end part 24 provides a good seal and also permits a certain amount of relative movement between the pipes as may be necessary in making up a string of pipes or in the use of the completed pipe line.

The gasket also includes an inwardly extending lip portion 26 which extends across the face of the end of the pipe 10 and abuts the bottom of the bell 18. The lip portion 26 enhances the sealing action of the gasket and also serves the purpose of permitting relative axial movement between the pipes as brought about by the expansion and contraction thereof, while at the same time relieving the pipes themselves of any undue stresses. It will be evident that the lip 26 will operate to maintain a seal between the end of the pipe 10 and the bottom of the bell 18 at all times.

In Figure 2 the sleeve part 22 consists of a thin flexible web portion 28 having spaced along its upper and outer surfaces a plurality of annular or spiral ribs 30 which press against the inside surface of the bell 18 and the outside surface of the pipe 10 to effect a seal.

In Figure 3 there is shown a gasket which is similar to that illustrated in Figure 2 and which bears corresponding reference numerals except that the sleeve part 22 of the gasket in Figure 3 is composed of a series of undulations 32 the high points of which alternately engage the inside of the bell 18 and the outside of the pipe 10 for effecting a seal therebetween.

As a modified arrangement either of the gaskets shown in Figures 2 and 3 may be modified as shown in Figures 4 and 5. It is customary in making up the bell end of a pipe to include an annular groove therein as indicated at 34 in Figures 4 and 5. This groove is for the purpose of receiving a snap ring or other rigid member for retaining packing material in the bell and spigot joints. The modification which is proposed of the gasket 20 is that of forming an enlarged part on the end thereof as at 36 in Figures 4 and 5 which includes a peripheral ridge 38 receivable in the groove 34. Thus, when the pipe joint is made up, the end 36 of the gasket is pushed down into the bell 18 of the pipe 12 until the ridge 38 snaps into the groove 34. This will operate to retain the gasket into position and at the same time, by making the gasket slightly over size axially, will also compress the sleeve part 22 and thereby enhance its sealing action.

In assembling the gasket it is preferable to place it over the spigot end of the pipe 10. This can readily be accomplished because the gasket is made of a resilient material such as rubber, or a rubberlike material such as any of several synthetic compounds among which are Duprene and neoprene. After the gasket has been placed over the spigot end of the pipe the spigot end of the said pipe together with the gasket is forced into the bell end. At this time it may be preferable to apply a lubricant to the outside of the gasket as indicated at 40 in Figure 6. This lubricant is preferably a substance which will set up and cement the gasket into the bell end of the pipe. Substantially any liquid cement may be employed in the capacity of a lubricant-adhesive for the purpose of this invention.

The joint according to this invention when finally made up will allow for lateral and axial displacement of adjacent pipe sections as well as a predetermined amount of relative movement angularly. Inasmuch as the gasket is tightly gripped between the bell and spigot parts of the pipe the sealing action thereof is highly efficient and effective over long periods of time. Also, due to the nature of the gasket according to this invention, it is unnecessary to grind off the clamp at the spigot end of the pipe in order to provide an adequate flexible sealing action. This is of value in reducing the cost of the installation by reducing the work operations necessary to prepare the pipes and also by reducing breakage of the pipes which would occur if they were machined when manufactured from certain types of brittle materials.

It will be understood that this invention is susceptible to modification in order to adapt it to different usages and conditions and, accordingly, it is desired to comprehend such modifications within this invention as may fall within the scope of the appended claims.

I claim:

1. In combination, a pipe having an expanded bell with a groove on the inner wall thereof, a second pipe having one end mounted within said bell and spaced therefrom, a shoulder on the end of the second pipe in the bell, an annular resilient sealing member having an outer end with a ridge inserted in said groove on the inner wall of the bell, the inner end of said sealing member being mounted over the shoulder of the second pipe and extending between the end of the second pipe and the bell, said sealing member including an intermediate connecting ring portion and a plurality of sealing members on the outer and inner sides of said portion spaced from one another.

2. In combination, a pipe having an expanded bell with a groove on the inner wall thereof, a second pipe having one end mounted within said bell and spaced therefrom, a shoulder on the end of the second pipe in the bell, an annular resilient sealing member having an outer end with a ridge inserted in said groove on the inner wall of the bell, the inner end of said sealing member being mounted over the shoulder of the second pipe and extending between the end of the second pipe and the bell, said sealing member including an intermediate connecting ring portion and a plurality of sealing members on the outer and inner sides of said portion spaced from one another, the inner end of the sealing member having a portion extending at substantially right angles to that portion of the sealing member which is mounted over the rib of the second pipe.

3. In combination, a pipe having an expanded bell with a groove on the inner wall thereof, a second pipe having one end mounted within said bell and spaced therefrom, a shoulder on the end of the second pipe in the bell, an annular resilient sealing member having an outer end with a ridge inserted in said groove on the inner wall of the bell, the inner end of said sealing member being mounted over the shoulder of the second pipe and extending between the end of the second pipe and the bell, said sealing member including an intermediate connecting ring portion and a plurality of sealing members on the outer and inner sides of said portion spaced from one another, the said ridge and groove being semi-circular in cross section.

DELBERT E. JACK.

(References on following page)

REFERENCES CITED

The following references are of record in the file of this patent:

UNITED STATES PATENTS

| Number | Name | Date |
|---|---|---|
| 1,867,775 | Stringer | July 19, 1932 |
| 2,093,386 | Tear | Sept. 14, 1937 |
| 2,116,705 | Marx | May 10, 1938 |
| 2,243,439 | Pranger | May 27, 1941 |
| 2,314,386 | Brend | May 23, 1943 |
| 2,396,491 | Chamberlain | Mar. 12, 1946 |

FOREIGN PATENTS

| Number | Country | Date |
|---|---|---|
| 649,385 | Germany | Apr. 9, 1946 |